Jan. 18, 1966  J. M. VEEDER  3,229,405
FRAME FOR BAIT CASTING ROD
Filed June 15, 1964
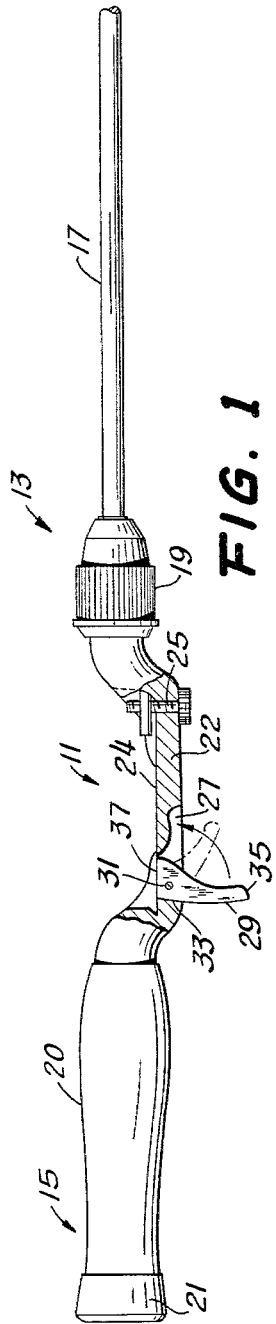
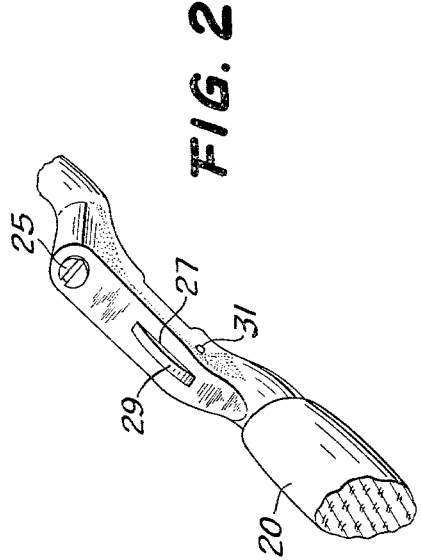
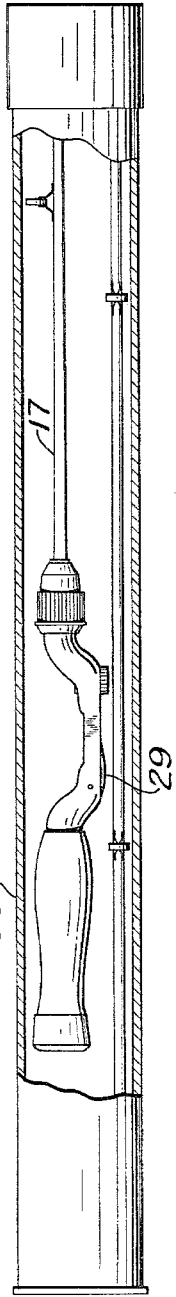
INVENTOR.
JAMES M. VEEDER
BY *Oscar B Brumbach*
his Attorney United States Patent Office 3,229,405
Patented Jan. 18, 1966

3,229,405
FRAME FOR BAIT CASTING ROD
James M. Veeder, Pittsburgh, Pa. (% Koppers Co., Inc., Monroeville Research Center, Box 128, Monroeville, Pa.)
Filed June 15, 1964, Ser. No. 375,149
1 Claim. (Cl. 43—18)

This invention relates generally to fishing rods of the bait casting type and more particularly to the frame portion of a bait casting rod.

The frame of a casting rod usually terminates at one end with a portion adapted to engage a pole, this usually being a chuck or other attaching device, and at the other end with a portion which is used as a manual grip. Intermediate these terminal portions is a further portion which is adapted to engage the base plate of a reel. This intermediate portion is offset from the axial line formed by the two terminal portions so that, as the line runs off the reel and through the guides on the pole, the line runs through the guides in a straight-line course that is approximately parallel with the pole. On the side of the frame opposite to the base plate of the reel is a projection or finger bar for engagement by the fisherman's index finger.

In use, the reel is on the upper, inner, side of the frame, the fisherman's hand is around the grip, and the fisherman's index finger extends around the projection at the lower side of the frame. Thus, as the fisherman snaps the rod forwardly to cause the bait to leave the rod and the line to flow outwardly from the rod, he controls the reel with his thumb, his hand grips the handle, and his finger pulls against the projection. This gives him a positive hold on the rod to resist the force in the direction of travel of the rod.

Urban areas are generally not areas susceptible to fishing, so it has been increasingly necessary for a fisherman to travel to a location remote from his home to enjoy good fishing. Accordingly, most fishing rods are demountable for packing. A problem arises in packing bait casting rods, however, because of the combination of the offset in the frame and the projecting finger portion. This has required the carrying cases to be large and has made it difficult to pack and unpack the assembly from the carrying case because the finger bar or portion has a tendency to get caught.

An object of this invention, therefore, is to provide an improvement in the frame whereby the frame can be readily packed and unpacked.

The invention contemplates a frame having a portion intermediate the handle and rod-engaging end portions offset from the axial line between the end portions for holding the reel and being provided with a projection for engagement by the fisherman's finger which projection is rotatable to lie axially of the frame for packing and perpendicular to the axis of frame for fishing.

There is described in Patent No. 2,498,648, a frame having a rotatable finger bar that is essentially a lock for holding the reel in place; the free end of the finger bar projects above the frame member and consequently the bar catches on the case, and interferes with packing, when the frame is to be packed.

In accordance with the present invention, the finger bar bears against the frame so that any reaction force is applied directly to the frame and consequently firm, positive control of the rod so necessary for playing game fish is readily maintained as opposed to a loose indirect control when the finger bar bears on the base of the reel. Rather than rely on a finger grip to hold the reel steady, conventional and time-tested clamps may be used to hold the reel to the frame in accordance with the present invention. The novel device of this invention does, in fact, provide for a locking of its rotatable finger bar in place for fishing by the clamping of the reel to the intermediate member. Thus the need for a sear spring or other element to hold the finger bar in extended position is avoided. In addition, the rotation of the finger bar to its position for packing can also serve to dislodge the reel from the frame.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike.

FIGURE 1 is a plan view of an embodiment of the novel frame of the present invention with a section of the frame broken out;

FIGURE 2 is an isometric plan view of a portion of the frame of FIG. 1; and

FIGURE 3 is a view of the frame in a carrying case with a section broken away.

Turning now to FIG. 1, the frame denoted as 11, is generally formed of a light, strong metal, such as aluminum or an aluminum alloy. The frame terminates in end portions 13 and 15. End portion 13 is a conventional chuck in which the pole 17 is inserted and nut 19 is tightened so that the pole 17 is firmly held in the chuck. End portion 15 is usually encased in a material 20 that is pleasant to the touch, such as cork, to provide a firm grip for the hand. An abutment 21 maintains the material 15 on frame 11.

The intermediate portion 22 of frame 11 is offset with respect to the axis of handle or grip portion 15 and chuck portion 13. The one side of portion 22 is flat so as to abut against the base plate of the reel. This reel is then securely fastened to portion 22 and engaged with the seat 24 by the screw and clamp arrangement 25. A projection or bar 29 for engagement with a finger extends from the other side of frame 11.

In accordance with this invention, frame 11 is slotted at a portion 27 and fingerpiece 29 is limitedly rotatable therein about pivot 31. Thus as the frame is to be placed into the packing case 30, projection 29 is moved to its position as shown in FIGS. 2 and 3 and as shown in the dotted line in FIG. 1. The free end 35 of the projection is thus seated in the slot 27 or tucked therein so as not to catch on the packing case. Thus only the normal width of the frame need be cleared by a packing case and member 29 is out of the way.

As the traveler reaches his destination, the frame 11 can be removed from the carrying case. Projection 29 can be moved to the position as shown in FIG. 1, the reel placed in the reel socket so that the base plate of the reel is firmly engaged with portion 22 of frame and there it is held by clamp 25. At this time, the finger projection 29 abuts against end wall 33 of slot 27 to give a firm abutment for the finger projection to resist the pull by the fisherman's index finger. The base of the reel bears against the end 37 of the finger bar 29 so that the finger bar is locked in its operative position perpendicular to the axial line of the frame. This eliminates the need for any sear spring to hold the finger bar in its operative position and the attendant disadvantages engendered by such sear spring.

When the fisherman has finished with his fishing, he loosens clamp 25 to remove the reel. If for some reason the reel seems stuck to frame 11, the cam action of end 37 of finger bar 29 aids in the removal of the reel.

The foregoing has presented a novel frame for a casting rod which enables the casting rod to be packed compactly for easy portability and to be easily unpacked for assembly and use.

I claim:

A frame for a casting rod having terminal end portions and an intermediate portion, one terminal end portion being adapted to engage a pole, the other terminal end portion being adapted to be used as a grip for manual engagement by fishermen, the intermediate portion being offset with respect to the axial line between the terminal end portions and having a flat portion for engagement with a base plate of a reel, a slot extending through said intermediate portion near the grip end and having one opening in a plane coplanar with said flat portion, a projection including a finger bar having one end adapted to be engaged by a fisherman's finger, means for pivotally mounting said projection in said slot for limited rotation whereby the projection is rotated so as to lie in said slot in a direction generally axially of the frame and is rotated so as to be in a direction substantially normal to the axial line of the frame for fishing, said slot including an abutment for engagement with said finger bar so that rotation of the projection towards the grip is stopped at an angle normal to the axis line of the frame, and said finger bar including a portion movable through said opening and being coplanar with said flat portion when said finger bar is in said normal position, said coplanar portion to be engageable by the reel to lock said finger bar in said normal position.

References Cited by the Examiner
UNITED STATES PATENTS

| | | | |
|---|---|---|---|
| 814,321 | 3/1906 | Pepper | 43—18 |
| 931,277 | 8/1909 | Crane | 43—23 X |
| 2,498,648 | 2/1950 | Christen | 42—22 |

SAMUEL KOREN, *Primary Examiner.*

R. L. HOLLISTER, *Assistant Examiner.*